United States Patent
Collins et al.

(10) Patent No.: US 6,599,493 B2
(45) Date of Patent: Jul. 29, 2003

(54) METHOD FOR PREPARING HYDROUS IRON OXIDE GELS AND SPHERULES

(75) Inventors: Jack L. Collins, Knoxville, TN (US); Robert J. Lauf, Oak Ridge, TN (US); Kimberly K. Anderson, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 201 days.

(21) Appl. No.: 09/917,117

(22) Filed: Jul. 27, 2001

(65) Prior Publication Data

US 2003/0021747 A1 Jan. 30, 2003

(51) Int. Cl.$^7$ ............................................. C01G 49/00
(52) U.S. Cl. ................ 423/632; 423/594.1; 423/594.2; 423/309
(58) Field of Search ................. 423/632, 633, 423/634, 594.2, 594.1, 309, 142, 143; 427/445; 502/8, 439; 204/456, 470, 466

(56) References Cited

U.S. PATENT DOCUMENTS

| | | | |
|---|---|---|---|
| 3,920,581 A | * | 11/1975 | Hilfman et al. |
| 3,931,351 A | | 1/1976 | Hinkson et al. |
| 4,397,778 A | | 8/1983 | Lloyd |
| 4,502,987 A | | 3/1985 | Lloyd et al. |
| 4,512,906 A | | 4/1985 | Hayakawa et al. |
| 5,207,973 A | | 5/1993 | Harris et al. |
| 5,821,186 A | | 10/1998 | Collins |
| 6,129,903 A | | 10/2000 | Kerchner |
| 6,492,016 B1 | * | 12/2002 | Lauf et al. |

OTHER PUBLICATIONS

Chem. Abstract 96:93554, 1981, no month.*
Chem. Abstract 136:106145, 2001, no month.*
Heinonen, O.J. et. al., "Sorption of Strontium (II) and Radio Strontium Ions on Sodium Titanate," Radiochimica Acta, 28, 93–96 (1981), no month.
Lloyd, M.H. et. al., "A Gel Sphere Process for FBR Fuel Fabrication from Coprocessed Feed," ORNL/TM–8399, Feb. 1983.
Collins, J.L. et. al., "The Basic Chemistry Involved in the Internal–Gelation Method of Precipitating Uranium as Determined by pH Measurements," Radiochimica Acta, 42, 121–134 (1987), no month.
Teichner, S.J., "Aerogels," ChemTech, 372–377, Jun. (1991).

* cited by examiner

Primary Examiner—Steven Bos
(74) Attorney, Agent, or Firm—Shelley L. Stafford

(57) ABSTRACT

The present invention is directed to methods for preparing hydrous iron oxide spherules, hydrous iron oxide gels such as gel slabs, films, capillary and electrophoresis gels, iron monohydrogen phosphate spherules, hydrous iron oxide spherules having suspendable particles homogeneously embedded within to form composite sorbents and catalysts, iron monohydrogen phosphate spherules having suspendable particles of at least one different sorbent homogeneously embedded within to form a composite sorbent, iron oxide spherules having suspendable particles homogeneously embedded within to form a composite of hydrous iron oxide fiber materials, iron oxide fiber materials, hydrous iron oxide fiber materials having suspendable particles homogeneously embedded within to form a composite, iron oxide fiber materials having suspendable particles homogeneously embedded within to form a composite, dielectric spherules of barium, strontium, and lead ferrites and mixtures thereof, and composite catalytic spherules of barium or strontium ferrite embedded with oxides of Mg, Zn, Pb, Ce and mixtures thereof. These variations of hydrous iron oxide spherules and gel forms prepared by the gel-sphere, internal gelation process offer more useful forms of inorganic ion exchangers, catalysts, getters, dielectrics, and ceramics.

47 Claims, 5 Drawing Sheets

METHOD FOR PREPARING HYDROUS IRON OXIDE GELS AND SPHERULES

The invention was made with government support under contract no. DE-AC05-96OR22464 awarded by the United States Department of Energy to Lockheed Martin Energy Research Corporation; and the government has certain rights in the invention.

FIELD OF THE INVENTION

The present invention relates to a method for preparing inorganic ion exchangers, catalysts, getters, dielectric materials and ceramic materials. In particular, the present invention is directed to a method for preparing gels, including electrophoresis gels and spherules of hydrous iron oxide and variations thereof. The hydrous iron oxide gels are prepared using an internal gelation process through the implementation of process control parameters that control the type of gel, gel shape and size, as well as microstructure of the material.

CROSS REFERENCE TO RELATED APPLICATIONS

The present application in part discloses material contained in U.S. Pat. No. 6,492,016, issued Dec. 10, 2002, entitled "Method for Preparing Spherical Ferrite Beads and Use Thereof," by Robert J. Lauf et al., filed on even date herewith, the entirety of which is incorporated herein by reference.

BACKGROUND OF THE INVENTION

Hydrated oxides of many metals (such as titanium, zirconium, iron, hafnium, tin, aluminum, lead, cerium, tungsten, magnesium, manganese, etc.), acidic salts of polyvalent metals (phosphates, tungstates, antimonates, molybdates, tellurates, selenates, silicates, vanadates and hexacyanoferrates of elements such as ammonium, titanium, zirconium, hafnium, tin, lead, etc.), and heteropoly acid salts (ammonium molybdophosphate, ammonium phosphotungstate, ammonium molybdosilicate, ammonium tungstoarsenate, titanium phosphosilicate, etc.) are very effective inorganic ion exchange materials. Because inorganic ion exchangers are stable in high radiation fields, they are especially important in the removal of radionuclides from waste streams. They have high selectivities and efficiencies for separating and removing fission products (e.g., cesium, europium, cerium, ruthenium, zirconium, and strontium), actinides, and other elements (such as silver, lead, mercury, nickel, zinc, chromium, and fluoride) from aqueous waste streams. Most of these materials are also compatible with the matrices used for long term waste storage such as in glass, phosphate or grout. Certain metal oxides, such as iron oxide and titanium oxide, are known to be effective for use in the photocatalytic decomposition of various hazardous organics and for many other catalytic purposes. Also, many metal oxides are known to be very effective as getters in removing volatile fission products from off-gas streams over a broad range of temperature. As used herein, the term "getters" is meant to include any material capable of trapping another material within the getter material. For example, quartz wool ($SiO_2$) is used to remove volatile radioactive cesium from the off-gas stream of gas-cooled nuclear reactors in Great Britain.

Inorganic exchangers and sorbents, such as hydrous iron oxide, are only commercially available as pure material in powder or granular form. These fine powders and granular particles are not readily adaptable to continuous processing, such as column chromatography. They have poor hydrodynamic properties. Some of these powders are also made as pellets by using binding materials; however, the binders tend to lessen the number of exchange sites that are available for use. The binders also tend to block pores and passageways to the exchange sites within the structures and can adversely affect the loading and kinetic behavior of the exchangers.

Another disadvantage of many of the powders, granular material, and pellets is lack of sorbent reproducibility of the inorganic ion exchangers. These materials are prepared in batch processes in which chemical and physical gradients can occur that cause variances in the crystal morphology and compositions of the products. Also, the granular material is not very stable and tends to powder or erode, causing problems in column operations. Pelletized hydrous iron oxide that is held together by binding material can be used in columns; however, the loading capacity of this material is lower. Additionally, organic binders, when used to make the pellets, are not stable when exposed to high radiation doses. Finally, resins that contain hydrous iron oxide particles have less capacity for loading and are not stable when exposed to high radiation.

Inorganic exchangers have also been made by taking fine particles of hydrous iron oxide and embedding therein organic resins or inorganic materials, such as asbestos or zeolites. However, these embedded particles suffer from the same disadvantages as the other particle and granular-based ion exchange materials.

Individuals have attempted to remedy the problems associated with powders and particles by forming gel particles. There are a number of gel forming processes used in the preparation of inorganic sorbents, catalysts, ceramic materials, dielectric materials, and getters. Common to all these processes is that the constituents of the processes need to be suitable for the bonding of colloidal particles into gel structures. The gels usually are hydrous metal oxides. These processes are generally identified as "sol-gel" processes and the chemistries are complex and path dependent. Typically, they are defined as external or internal gelation processes. In the external gelation processes, gelation reactions involve mass transfer to a second phase or fluid. By comparison, there is little or no mass transfer in the internal gelation processes.

One of the original external gel processes for the preparation of nuclear fuels was developed at Oak Ridge National Laboratories (hereinafter ORNL). It was based on the gelation of colloidal sol droplets by extracting the water from them in an immiscible alcohol. In other external gelation processes developed at various European laboratories, droplets of solutions of organic polymers or sols were chemically gelled with ammonia, usually by mass transfer of the ammonia from a surrounding gas or solution.

Making silica-alumina gel as spheres is an example of one internal gelation process. Gel spheres were made by continuously mixing an acid solution of $AlCl_3$ or $Al_2(SO_4)_3$ with sodium silicate as drops into an immiscible organic medium. The aqueous droplets gelled while in the organic medium. The key to this process was the slow or delayed gelation of silica when the sodium silicate was acidified.

The most widely studied internal gelation processes in recent years involve the water hydrolysis of metal alkoxides. In these processes, solution temperature and pH are key parameters used in controlling hydrolysis and polymerization. However, materials made by the metal alkoxide processes typically are fine powders. Additionally, due to the complex chemistries involved and the difficulty in operating the process, it was difficult to form gel-spheres of hydrous metal oxides wherein the reaction could be controlled and the final product was predictable.

Accordingly, what is needed is a method of forming a hydrous metal oxide gel, specifically a hydrous iron oxide gel, wherein the gel is effective as an inorganic sorbent, catalyst, ceramic material or getter. What is also needed is a method of forming a hydrous metal oxide gel wherein the characteristics of the gel may be controlled to provide a gel that is useful for a variety of different uses. Finally, what is needed is a method of forming a hydrous metal oxide gel wherein the metal oxide gel may include other constituents that are selected to remove a variety of different materials, thereby increasing the usefulness of the metal oxide gel.

OBJECTS OF THE INVENTION

Accordingly, it is an object of the present invention to provide new methods for preparing inorganic ion exchangers and sorbents into a more useful form.

It is another object of the present invention to provide new methods for preparing more useful forms of catalysts.

Yet another object of the present invention is to provide new methods for preparing more useful forms of dielectric materials.

Still yet another object of the present invention is to provide new methods for preparing more useful forms of getters.

Another object of the present invention is to provide new methods for preparing more useful forms of ceramic materials.

Still another object of the present invention is to provide new methods for preparing gels for use in capillary, film or slab gel electrophoresis.

It is still yet another object of the present invention to provide new methods for creating more surface area in hydrous iron oxide gels.

Another object of the present invention is to provide new methods for forming macroporous iron oxide spherules.

Yet another object of the present invention is to provide new methods for converting hydrous iron oxide spherules to other chemical forms, including, but not limited to, phosphates, tungstate, molybdate, vanadate, and selenate.

Still another object of the present invention is to provide new methods for making ultra fine hydrous iron oxide particles using an electric dispersion reactor (EDR).

Another object of the present invention is to provide spherules of hydrous iron oxide and variations thereof that are used as inorganic ion exchangers.

It is still another object of the present invention to provide spherules of hydrous iron oxide and variations thereof that are used as catalysts.

Yet another object of the present invention is to provide spherules of hydrous iron oxide and variations thereof that are used as getters.

It is still yet another object of the present invention to hydrothermally convert hydrous iron oxide spherules to ferrite spherules of barium, strontium, and lead and mixtures thereof, which have catalytic and dielectric properties that are useful in the catalyst and the electronic industries Another object of the present invention is to provide new inorganic ion exchangers as spherules that exhibit good chemical stability in acidic and basic solutions.

Still another object of the present invention is to provide new inorganic ion exchangers as microspherules that are highly selective for certain cations and anions.

Yet another object of the present invention is to provide new inorganic ion exchangers as microspherules that are compatible with final waste forms.

It is still another object of the present invention to provide new inorganic ion exchangers as microspherules that improve the flow dynamics for column operations.

These and other objects, features and advantages of the present invention will become apparent after a review of the following detailed description of the disclosed embodiments and the appended claims.

SUMMARY OF THE INVENTION

In accordance with one aspect of the present invention, the foregoing and other objects are achieved by a method for preparing hydrous iron oxide gels comprising the steps of first forming a stable homogeneous aqueous broth comprising HMTA, urea and an iron metal salt. The broth has an HMTA concentration in a range from about 0.4 M to about 2.5 M, a urea concentration in a range from about 0.4 M to about 4.0 M, and an iron metal salt concentration in a range from about 0.4 M to about 2.2 M. Then, the aqueous broth is placed within a gel-forming operation, wherein the gel-forming operation is at a temperature from about ambient to about 100° C. The temperature of the gel-forming operation is maintained from about ambient to about 100° C. to form a hydrous iron oxide gel using an internal gelation process.

In accordance with another aspect of the present invention, other objects are achieved by a method for preparing hydrous iron oxide gel comprising the steps of first forming a homogeneous aqueous broth comprising HMTA, urea, an iron metal salt, wherein the broth is at a temperature from about 0° C. to about 10° C., and wherein the broth has an HMTA concentration in a range from about 0.4 M to about 2.2 M, a urea concentration in a range from about 0.4 M to about 4.0 M, an iron metal salt concentration in a range from about 0.4 M to about 2.2 M with the iron being partially hydrolyzed with ammonium hydroxide to provide an $OH^-/Fe^{+3}$ mole ratio of 0.0 to 1.5, further wherein said broth has a mole ratio of HMTA to iron greater than 0.75:1 and a mole ratio of urea to iron greater than 0.75:1. Then, placing the aqueous broth within a gel-forming operation, wherein said gel-forming operation is at a temperature from about 45° C. to about 95° C.; and then maintaining the temperature of the gel-forming operation from 45° C. to about 95° C. to form a hydrous iron oxide gel using an internal gelation process.

BRIEF DESCRIPTION OF THE DRAWINGS

In the drawings:

FIGS. 1 and 1a illustrate an apparatus useful in an internal gelation process for making hydrous iron oxide spherules according to one embodiment of the present invention.

Figure 1:
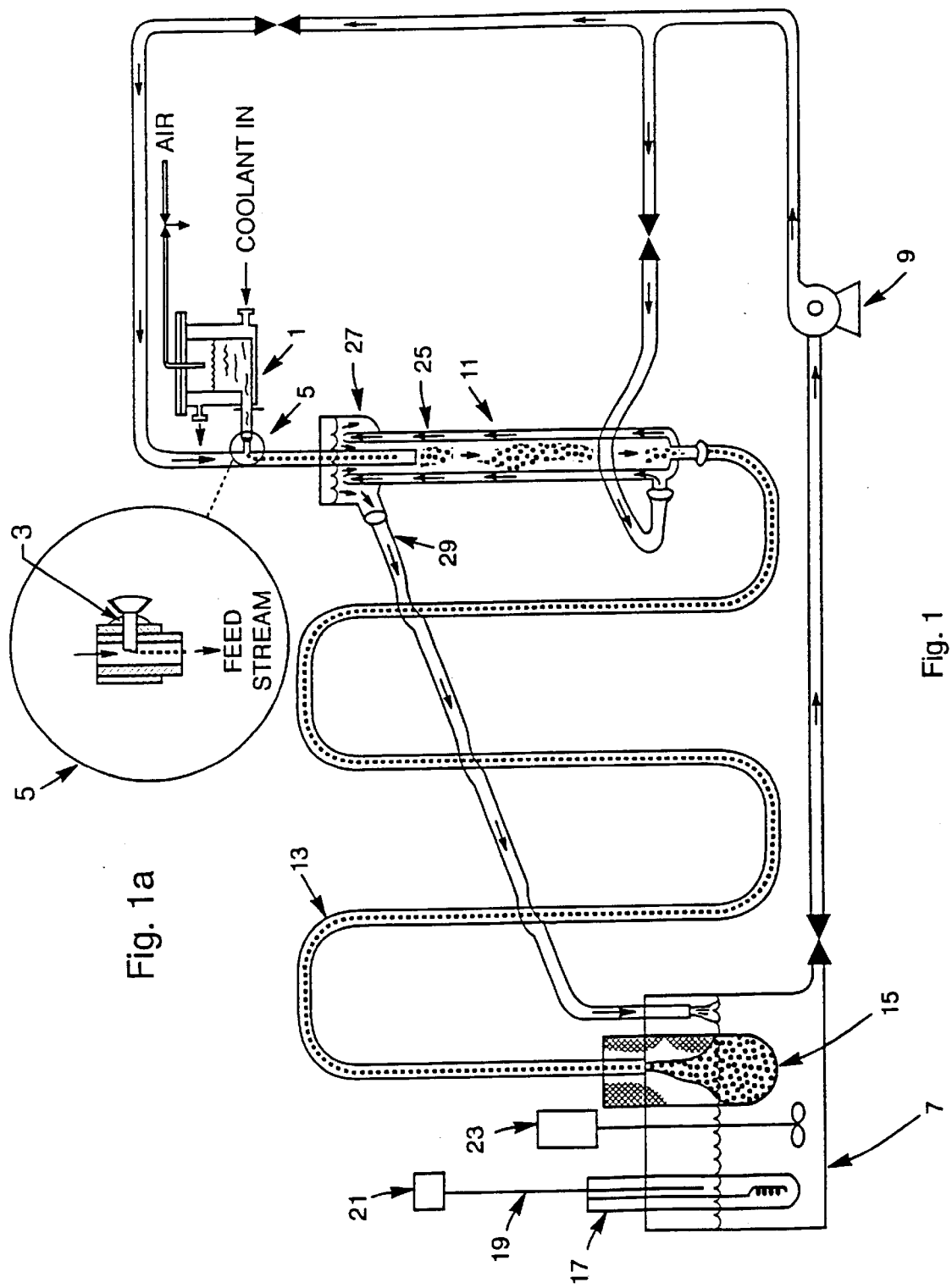

For a better understanding of the present invention, together with other and further objects, advantages and capabilities thereof, reference is made to the following disclosure and appended claims in connection with the above-described drawings.

DETAILED DESCRIPTION OF THE INVENTION

The method of the present invention uses optimum formulations and conditions for making hydrous iron oxide gels. These optimum formulations and conditions create an optimum process parameter window for making hydrous iron oxide spheres, films, slabs, and fibers. The present invention is unique in that it provides a method for making ion exchangers, catalysts, ceramic materials, dielectric materials, and getters into a more usable form rather than as a powder or granular form. Spherules of pure hydrous iron oxide may be made by the method of the present invention. The spherules may be of a specific size, such as in a diameter range of 0.1 mm to 2 mm, and may be reproducibly made using laboratory and engineering scale equipment.

Additionally, the present invention can also be used to make spherules in which very fine particles of other chemicals, metals, and biochemicals are homogeneously dispersed throughout the matrix of the gel. Variations of composite spherules of hydrous iron oxide that contain fine particles of other inorganic ion exchangers include, but are not limited to, (phosphates, tungstates, molybdates, vanadates of titanium, zirconium, and hafnium), (sodium and potassium hexacyanoferrates), (sodium and potassium silicozirconates and silicotitanates), ammonium molybdophosphate, and ammonium phosphozirconate. These materials are embedded homogeneously throughout the gel matrix to produce dual-purpose ion exchangers capable of removing several different contaminants from a waste stream. For example, hydrous iron oxide spherules can be made that contain potassium cobalt hexacyanoferrate particles. In a pH-basic stream saline solution, this material can selectively remove cesium, uranium, and strontium. The hydrous iron oxide sorbs the strontium, uranium, and the potassium cobalt hexacyanoferrate sorbs the cesium. In some cases, gelatinous spherules of hydrous iron oxide can be converted by chemical reactions to other ion exchanger spherules such as iron monohydrogen phosphate and iron hexacyanoferrate. The hydrous iron oxide spherules can also be converted to other chemical forms, including, but not limited to, tungstate, molybdate, vanadate, and selenate. Furthermore, to create more surface area, spherules can be prepared containing embedded particles of material that can subsequently be dissolved and removed to create larger, interconnecting pores within the spherules.

Finally, the present invention may be used to form hydrous iron oxide gels in any shape, such as films, slabs, and fibers, wherein these iron oxide gels may be used alone, or post-treated as set forth above, to be used as inorganic ion exchangers, catalysts, getters, dielectric materials, and ceramic materials in systems which may preclude the use of spherules.

In one embodiment of the present invention, the hydrous iron oxide may be formed into spherules for use as an inorganic ion exchanger. Preparation of inorganic ion exchangers as spherules improves the flow dynamics for column operations and expands their practical applications. The hydrous iron oxide spherules produced by the present invention can be reproducibly made on a small or large scale. These inorganic ion exchangers are stable in high radiation fields. Additionally, many embodiments of the present invention, exhibit good chemical stability in acidic and basic solutions, while some embodiments are highly selective for certain cations and anions. Finally, most embodiments are compatible with final waste forms, such as for inclusion in a vitrification process or placement into concrete. Inorganic spherules produced by the present invention are also capable of removing highly radioactive fission products from radioactive cell waste solutions. In addition, the inorganic ion exchanger spherules produced by the present invention have sorption characteristics that are equal to or better than those obtained for most commercial powders tested. One advantage of the present invention is that the densities and/or porosities of the spherules can be tailored by varying process parameters to produce a finished spherule that is optimally designed for a specific sorption process.

Some ion exchange applications of the spherules of the present invention include removing certain fission products and actinides from slightly acid solutions, as well as removing certain fission products and actinides from alkaline tank supernatants. The spherules can also be used for treating contaminated wastewater to remove undesirable elements such as lead and mercury. Other applications of the present invention include removing radioisotopes from groundwater and removing actinides and fission products from sludge leachates. In addition, other applications include removal of heavy metals from slightly acidic mine drainage; removal of radionuclides from organic streams; and cleanup and concentration of liquid wastes in radioactive cells.

The method of the present invention can also be used as a means of preparing gels for potential use in capillary, film or slab gel electrophoresis. For example, the gel formulations may be vacuumed into capillary tubes that are then heated to cause formation of fibrous gels. The same procedure may also be used to make hydrous iron oxide films or slab gels. The gel formulations of the present invention may be drawn into molding cavities and heated to form the gel film or slab. The surfaces of the molding cavities may be pretreated to facilitate removal of the gels. Once removed from the molds, the gels are easily washed to remove any reaction impurities.

The method of the present invention uses optimum formulations and conditions for making hydrous iron oxide gels. These formulations or "broths" are an important aspect of making the hydrous iron oxide gels. Without the proper broth formulations and reaction conditions, it is not possible to form the desired hydrous iron oxide gel sphere. Therefore, even though the internal gelation process used to form other types of spherules, one cannot simply make hydrous iron oxide gels without using the proper formulation and reaction conditions. Additionally, by controlling the broth, it is possible to affect the final characteristics of the gel, such as size, shape, porosity, and density.

Therefore, the key parameters of the method of the present invention include the following: concentrations of the constituents of the broth, broth stability, reaction temperature, gelation time, completeness of gelation, and the structures and chemical compositions of gels formed.

The concentrations of the constituents of the broth are an important factor in making spherules by the internal gelation process. These constituent concentrations influence the broth stability, gelation times, and types of gels. In the method of the present invention, a broth for making hydrous iron oxide contains three chemical constituents: an organic base; a complexing agent; and an iron metal salt. The initial concentrations of these constituents in the broth and the order of mixing these chemicals are important. Initially, two separate stock solutions are prepared. One stock solution contains the organic base and the complexing agent and the other stock solution contains the iron metal salt solution. Alternatively, the complexing agent can be added to the iron metal salt rather than with the organic base solution. The complexing agent can be added to either solution provided the final mole ratio of complexing agent to iron is greater than or equal to 1. The preferred practice of the present invention is to use a mole ratio of complexing agent to Fe that is similar to the mole ratio of organic base to Fe. To prepare a broth, these solutions are chilled to less than about 10° C., and preferably near 0° C. before they are mixed. To lessen the chance of premature precipitation of the iron in the preparation of a broth, best practice is to slowly add the prescribed amount of organic stock solution to a prescribed volume of iron salt stock solution.

The method of preparation of iron salt feed differs from the method of preparation of titanium salt feed that is used to prepare hydrous titanium oxide spherules. To prepare a stable titanium salt feed, prescribed amounts of acid (usually nitric acid) are added to prevent premature precipitation of the titanium (Reference: U.S. Pat. No. 5,821,186 by J. L. Collins entitled "Method of Preparing Hydrous Titanium Oxide Spherules and Other Gel-Forms Thereof", issued October 1998). Acid additions are not required to prepare iron salt stock solutions. Concentrated iron salt stock solutions can be prepared by dissolving a soluble iron salt (such as ferric nitrate, chloride, acetate, etc.) in water. Dilute nitric acid can be used to increase the iron concentration. For preparations described in this patent application, ferric nitrate nonahydrate was the preferred salt that was dissolved in deionized hot water to prepare stock solutions with iron concentrations of 2.2 to 2.5 molar. To provide more control of the gelation time in the preparations of the hydrous iron spherules; more control of the amount of organic base needed in preparations; and more control of the temperature needed to cause gelation, it was discovered that chilled (0 to 10° C.) ammonium hydroxide could be added slowly with mixing to chilled iron salt feed at the same temperature to prepare iron salt feeds in which the iron was partially hydrolyzed. Four clear, iron salt feed stock solutions were prepared with $OH^-/Fe^{+3}$ mol ratios of 0.0, 0.5, 1.0, and 1.5.

The organic base, hexamethylenetetramine (HMTA), is used to help form the gel spherules. In this internal gelation method, the broth is introduced into a heated organic medium to form the gel spherules. Introduction of the broth droplets into a flowing stream of hot organic medium causes decomplexation of the iron molecules that are complexed with urea (complexing agent), which then allows the iron to be hydrolyzed. The hydrolysis reaction is first driven by protonation of the organic base molecules that effectively removes $H^+$ from the broth. [Reference, J. L. Collins, M. F. Lloyd, and R. L. Fellows, "The Basic Chemistry Involved the Internal-Gelation Method of Precipitating Uranium as Determined by pH Measurements," *Radiochimica Acta* 42, 121–34 (1987).] Once the organic base molecules are completely protonated, they decompose and remove more hydrogen ions. For example, one HMTA molecule can remove four hydrogen ions from the broth. The rates at which these reactions occur depend upon the temperature of the broth and upon the concentrations of the constituents. For gelation to occur, the pH of the broth droplets should be at or above the pH of precipitation. Precipitation of hydrous iron oxide begins in the pH range of 2 to 3. Therefore, a preferred organic base is one that protonates and decomposes to remove hydrogen ions and hydrolyzes the reaction. The preferred organic base is HMTA.

The complexing agent is used to complex with the iron and allows for stable broths at 0 to 10° C. As used herein, "stable broth" is meant to include a broth that stays clear and free of metal gelation or precipitation for a reasonable period of time, preferably >1 hour, before gelation is initiated. As discussed, the organic base is used to hydrolyze the iron and cause gel formation at higher temperatures. At higher temperatures, the complexing agent also catalyzes the decomposition of protonated organic base molecules, resulting in the organic base molecules being a more effective base. However, decomposition only occurs after most of the organic base molecules have been protonated. To provide more control over the final concentrations of the constituents in the broth, a saturated stock solution of about 3.2 M organic base is prepared which also has a complexing agent concentration of about 3.2 M. The amount of the complexing agent does not have to approximate the amount of the organic base, though this type of broth is preferred as it ensures the proper mole ratios as against the amount of iron. The preferred complexing agent is urea.

The first stock solution comprises the organic base and the complexing agent. Additionally, since the final broth preferably has both a mole ratio of organic base to Fe and a mole ratio of complexing agent to Fe in the range from greater than 0.75 to less than 2.75. Preferably the first stock solution has a mole ratio of organic base to complexing agent of about 1:1, although the exact ratio of organic base to complexing agent may vary as desired. The stock solution should be chilled to less than about 10° C., and more preferably to about 0° C., prior to mixing with the second stock solution comprising the iron metal salt. The stock solution is chilled to avoid premature gelation since the hydrous iron oxide will gel as the temperature increases.

In a preferred embodiment, the first stock solution of organic base and complexing agent comprises HMTA as the organic base and urea as the complexing agent. The stock solution is preferably prepared using pure crystalline HMTA rather than the more commonly used free flowing form of HMTA. The free flowing form is granular HMTA that contains additives that prevent clumping. Clumping is problematic with the pure crystalline form of HMTA. It was discovered that the additives used to make the HMTA free flowing also cause an undesirable reaction to occur between the HMTA and urea. This reaction can be detrimental to the internal gelation process, thereby making it less reproducible, especially for runs at higher temperatures (i.e., >80° C.). This behavior was observed when samples of about 3.2 M HMTA (free flowing type) and about 3.2 M urea were heated together at 95° C. for several minutes. The solution developed a pearl-essence that intensified with time. Therefore, the crystalline form of HMTA is recommended in the process of the present invention; however, the free flowing form of HMTA can also be used in some applications, especially at temperatures <80° C. and for some applications at temperatures >80° C., depending upon which additives the manufacturer added to the HMTA to facilitate its free-flowing properties.

The second stock solution used to make the broth of the present invention comprises the iron metal salt. Iron metal salts useful in the present invention include any iron salt that is soluble. The iron metal salt should provide a sufficient Fe ion concentration in the solution. Examples of these soluble iron metal salts include, but are not limited to, iron nitrate, iron chloride, and iron acetate.

Iron nitrate or the other soluble salts mentioned above can be added to hot deionized water to obtain stock solutions with iron concentration as high as 2.5 M $Fe^{3+}$. To obtain a greater range of usable broth formulation that allows minimal use of the organic base and lower temperatures for gel formation, the present patent application utilizes partial hydrolysis of iron nitrate (or other anion) with base, preferably ammonium hydroxide ($NH_4OH$). The degree of partial hydrolysis of the iron used in a broth is one of the important process parameters for the present invention. The amount of partial hydrolysis of the iron in a broth is a controlling parameter for the gelation process for making hydrous iron oxide spherules, or gels in other configurations.

When forming the second stock solution, as with the first stock solution, the solution should be chilled to less than about 10° C., and more preferably to about 0° C., prior to mixing with the first stock solution. Then, when the two solutions are mixed, the final broth will also be chilled to less than approximately 10° C. This is one of the important factors in making a stable broth. In the present invention, the optimum process parameter window for making spherules of hydrous iron oxide includes a broth that is stable for a reasonable period of time at ice bath temperatures near 0° C. Broth formulations that are stable for >1 hour are desirable for large-scale preparations. The formulations declared in the optimum process window for this invention are therefore stable for >1 hour. The broth droplets should be introduced in a hot organic medium before gelation is initiated. Broths that gel in less than one hour could be used if the first stock solution of the organic base and complexing agent and the second stock solution of iron metal salt were pumped from separate tanks into a mixing device prior to ejection as droplets into the hot organic medium. A mixing method of this type would likely be used in large-scale production of spherules.

To make reproducible gel spherules, it is important that the ingredients in the broth be thoroughly mixed. The stock solution of organic base and complexing agent and the stock solution of iron metal salt are combined in a chilled mixing device or by pumping the two different solutions, at temperatures in a range from about 0° to 10° C., from separate tanks into a mixing device at a desirable rate to make the specific broth desired. The batch volume used and the desired pumping rates for a broth are dependent upon the type of gel sphere desired, whether it is a soft, medium or hard gel. In the present invention, the type of desired gel sphere is selected from an optimum process parameter window, as shown in the Examples. These examples provide preferred broth formulations and gel forming conditions that are used to make hydrous iron oxide gel spheres.

As shown in the Examples, the process parameters of broth formulations within this defined window are very important in forming the hydrous iron oxide gels. If the constituent concentrations for the organic base, complexing agent, iron metal salt fall outside these parameters, then either the broth will gel instantly once the constituents are mixed, or not at all.

In general, the molarity of the iron in the broth should be in the range of about 0.4 to about 2.2 M. However, the normally preferred molarity of iron in the broth is in the range of about 1.0 M to about 1.6 M. An HMTA/Fe mole ratio of >0.75 is needed for gelation to occur for a specified gelation time of <60 seconds; broths with HMTA/Fe mole ratios >2.75 are not stable. Lower ratios may be used if gelation times >60 seconds are desired. In these situations, the gels formed will be larger in size due to coalescence. These formulations could also be used for non-sphere applications.

The amount of the organic base and the complexing agent in the broth will be approximately the same for the reasons previously discussed. These amounts will vary depending on the temperature at which the gel is formed. Higher temperatures permit the use of lower amounts of organic base and complexing agent, and lower temperatures require the use of larger amounts of organic base and complexing agent. In the present invention, the temperatures at which the gels may be formed range from ambient temperature to about 100° C. These temperature conditions require the concentration of the organic base and the complexing agent in the broths to range from about 1.2 M to about 2.0 M. When mixed with an equal molar concentration of urea, the maximum HMTA concentration obtainable is about 3.2 M. Without the urea, a 3.5 M HMTA solution can be prepared. However, in determining the concentration of the organic base and the complexing agent, it is important to remember that the HMTA/Fe and urea/Fe mole ratios normally should both be >1. It is to be understood that the mole ratio of organic base:complexing agent, while preferably about 1, may be any desired ratio >1.

The amount of partial hydrolysis of the iron with ammonium hydroxide in salt feed solution preparations can range from none to an $OH^-/Fe^{3+}$ mole ratio of 1.5. Partial hydrolysis of the iron provides a greater range of usable broth formulation that allows minimal use of the organic base and lower temperatures for gel formation. The degree of partial hydrolysis of the iron used in a broth is one of the important process parameters for the present invention. The amount of partial hydrolysis of the iron in a broth is a controlling parameter for the gelation process for making hydrous iron oxide spherules, or gels in other configurations.

Therefore, in a preferred embodiment of the present invention for making spherules, the degree of partial hydrolysis of the iron with ammonium hydroxide in salt feed solution preparations is in the range from none to $OH^-/Fe^{3+}$ mole ratio of 1.5. The ideal Fe concentration in the broth is between about 1.0 M and about 1.6 M. The amount of organic base and complexing agent used will be dependent upon the concentration of Fe and the gel-forming temperature. Preferably, the amounts of the organic base and the complexing agent are from about 1.2 to about 2.0 M. If the mole ratio of HMTA/Fe is kept substantially constant at the desired ratios for each of the organic base and the complexing agent, dilution of any of the above mentioned broth mixtures slightly increases the gelation time and yields softer gel structures. The rigidity only slightly decreases by a 20% dilution. Decreasing the ideal broth concentrations of Fe in the broths to 0.5 to 0.8 M and the ideal broth concentrations of HMTA to 0.6 to 1.0 M, causes the gel times to increase and the gel rigidities to decrease (softer gels).

Gels prepared as described in the Examples give a range of rigidities from soft to hard. Initially, a range of relative gel rigidities was determined by conducting small scale, test tube studies using about 0.5 mL of broth. In each study, a test tube containing 0.5 mL of broth was inserted into a water bath that was maintained at a temperature range of 45° to 55° C. or 55° to 65° C. or 65° to 75° C. or 75° to 85° C. or 85° to 95° C. After bath immersion for 10 minutes, the test tube was removed and cooled to room temperature. A small metal laboratory spatula was inserted into each gel to determine the apparent rigidity of the gel formed. A nominal scale of 1 to 10 collins units of rigidity was used to define the rigidity of the gel. A unit of 1 collins represented gels with the approximate consistency of water and 10 collins representing gels that were almost too hard to penetrate with the spatula. Most of the gels formed using broth parameters of the present invention had rigidities between 3 collins and 9 collins. Gels ranked as 3 to 4 collins were very soft and pasty, whereas gels ranked as 8 to 9 collins were difficult to penetrate and stir with the spatula because they had a hard, dry, granular consistency.

In making more accurate dynamometric measurements of the compression strengths of the gel-spherules, the hardest gels (8 and 9 collins) were capable of withstanding a force up to about 60 grams before losing their shape. On the other hand, the softest gel-spherules with rigidity ratings of 3 collins and 4 collins were easily compressed with forces of 5 grams or less. For the broth formulations defined in the Examples, the hardest gels, 9 collins, can only be made at higher temperatures (>85° C.). Gels that ranked as 8 collins can be made at temperatures >65° C. Gels that ranked as 5 collins to 7 collins can be made at temperatures >65° C.

As previously discussed, the optimum process parameter window for making spherules of hydrous iron oxide includes that the broth is stable from about 0° C. to about 10° C. for a reasonable period of time, sufficient to prevent premature hydrolysis and gelation of the Fe prior to being introduced as droplets into the heated organic medium. The broth formulations declared in the optimum process window of the present invention are stable for >1 hour.

Reaction temperature and gelation time are also important process variables. The organic medium is preferably water-immiscible with a density slightly higher than that of the aqueous broth. Large droplets are best formed if there is a density difference between the organic medium and broth of about 0.05 to 0.10 g/cm$^3$. The density difference can be less for small droplets. Other important process variables that should be considered in performing the methods of the present invention include flammability, toxicity, impurities, cost and disposal of the organic medium.

The organic medium may be a one-component solvent or a binary mixture. For example, silicone oils, such as Silicon Fluid 200 (Dow Corning, Midland, Mich.), work well for the temperature range from ambient temperatures to 100° C. A mixture of approximately 75% perchloroethylene (PERC) and 25% iso-amyl alcohol (IAA) can be used at temperatures up to about 90° C., but does not require an organic wash before the basic washes. Trichloroethylene (TCE) can be used at temperatures of <65° C. Kerosene type hydrocarbons and 2-ethyl-1-hexanol may also be used as gel forming media.

If the organic spherule-forming medium has a high viscosity or boiling point (e.g., PERC, 2-ethyl-1-hexanol or silicone oil), the residual medium on the gelled spherules has to be removed by washing with a more volatile organic medium. TCE, carbon tetrachloride or hexane can be used for silicone oil; isopropyl alcohol for PERC; and carbon tetrachloride for 2-ethyl-1-hexanol. After aging of the gel, neither TCE nor the 75% PERC—25% iso-amyl alcohol mixture requires an organic wash.

Introduction of the aqueous broth droplets into a flowing stream of hot, water-immiscible, organic medium causes decomplexation of the Fe molecules that are complexed with the complexing agent, allowing hydrolysis and gelation of the Fe to occur. The hydrolysis reaction is driven by protonation of the organic base molecules, which effectively removes H$^+$ from the broth. The hydrolysis reaction is also driven, in some cases, by the decomposition of the protonated organic base molecules to form ammonia molecules. The rate at which these reactions take place depends upon both temperature and the concentrations of the constituents in the broth.

The pH value of the broth droplets must be at, or above, the pH value of precipitation for gelation to occur. Precipitation begins in the pH range of 2 to 3 for hydrous iron oxide. The organic medium is heated at a temperature in the range of 45° C. to 100° C. to obtain acceptable gelation times for hydrous iron oxide. A gelation time of <60 seconds is recommended. For operating reasons and for practical purposes, gelation times of <30 seconds are normally preferred. As the microdroplets of broth remain ungelled in the hot organic medium, the risk of their coalescing and forming larger droplets increases.

The temperature of the organic medium used also affects the hardness of the gel formed, from soft to hard. The spherules are held in the hot organic medium and allowed to age until they are removed. Allowing the gelled spherules to remain in the heated organic medium for a period of 10 to 30 minutes assures completion of iron hydrolysis and reproducibility of the gelation process. The degree of aging can influence the type of gel structure obtained. After being held in the heated organic medium for a period of <60 minutes, preferably between 10 and 30 minutes, to allow for completeness of the gelation and for aging, the spherules are removed from the organic medium. Then, the spherules are washed with ammonium hydroxide (NH$_4$OH), generally <1 M, to remove the residual impurities, and dried. If silicone oil, 2-ethyl-1-hexanol, or PERC is used, the residual medium on the gelled spherules is removed with an organic solvent, such as trichloroethane (TCE), before basic washing with an aqueous medium. The soluble reactants and reaction products, organic base, complexing agent and ammonium salts, such as ammonium nitrate, can be removed from the gelled spherules by washing with 0.1 M to 5 M ammonium hydroxide and then with deionized water. Less than 1 M is preferred.

The type of drying procedure employed depends upon the intended use of the spherules, such as sorbents, catalysts, ceramics, dielectrics, or getters. A number of drying methods may be employed. For an example, see ORNL/TM-8399 report published February 1983 by M. H. Lloyd et al., entitled "A Gel Sphere Process for FBR Fuel Fabrication from Coprocessed Feed," incorporated herein by reference in its entirety. The drying conditions of the wet spherules were found to have a pronounced effect on the densities of the final oxide products. To make ceramic oxides as crystals to be used as catalysts, dielectric materials, and getters, parameters such as heat-up rate, time, temperature, and drying atmosphere affect crystal growth. For instance, steam can be used in the drying process to produce larger crystals. For use as inorganic ion exchangers, the wet hydrous iron oxide spherules only need to be air-dried to a constant ambient temperature. Hydrous iron oxide ion exchangers that have been made as powders are known to be much less effective as sorbents when the interstitial liquid and water of hydration are removed at temperatures >100° C.

Preparation of inorganic ion exchangers as spherules improves the flow dynamics for column operations and expands their practical applications. The hydrous iron oxide spherules produced by the present invention can be reproducibly made on a small or large scale. These inorganic ion exchangers are stable in high radiation fields. Many exhibit good chemical stability in acidic and basic solutions while some are highly selective for certain cations and anions. Finally, most are compatible with final waste forms since they may be vitrified or inserted into concrete or any other final waste form process. Inorganic spherules produced by the present invention are useful to remove highly radioactive fission products from hot cell waste solutions. In addition, the inorganic ion exchanger spherules produced by the internal gelation process of the present invention have sorption characteristics that are equal to or better than those obtained for most commercial powders tested. In many instances, the densities or porosities of the exchangers can be tailored by varying the process parameters.

Some ion exchange applications include removing certain fission products and actinides from slightly acidic solutions, as well as removing from tank waste supernatants. The spherules can also be used for treating contaminated wastewater to remove uranium, mercury, and lead, among others. Another application of the present invention includes removing radioisotopes from groundwater and removing actinides and fission products from sludge leachates. In addition, other applications include removal of heavy metals from slightly acid mine drainage; removal of radionuclides from any fluid including organic streams; and cleanup and concentration of liquid wastes in hot cells.

The methods of the present invention can also be used as a means for preparing gels for potential use in capillary, film or slab gel electrophoresis. For example, a chilled aqueous broth may be vacuumed into capillary tubes or some other article wherein the broths are then heated in the temperature range from about ambient temperatures to about 100° C. to cause gelation. The time of gelation is dependent upon the broth formulation and the temperature. This system defines a gel-forming operation whereby the gels are formed within or on the desired article upon heating in the temperature range from about ambient temperature to about 100° C. Some gels within the gel-forming operation may simply form at room temperature. The same procedure may be used to make hydrous iron oxide films or gel slabs. These films or gel slabs are formed using a gel-forming operation in which the broth is gelled at a temperature from about ambient temperature to about 100° C. on a desired film- or slab-forming substrate. The gel-forming operation to form the gel configuration using the internal gelation process is a system in which the formulated broths of the present invention are drawn into molding cavities and heated to temperatures in the range from about ambient temperatures to about 100° C. The surfaces of the molding cavities may be pretreated for easier removal of the gels. Once removed from the molds, the gels may then be washed to remove any reaction impurities.

FIG. 1 sets forth a lab-scale apparatus for forming hydrous iron gel spherules according to the present invention. A chilled broth is first formed and then added to the chilled apparatus broth pot 1 and processed through the gel-forming or spherule-forming apparatus. The system also includes a needle 3 that is used in a two-fluid nozzle 5 for placing broth droplets in the hot organic medium where they gel. The apparatus also includes a reservoir 7 for heating the organic medium, a pump 9 for circulating the organic medium, a chilled broth pot 1, a two-fluid nozzle system 5 for controlling the size of the broth droplets, a glass gelation column (forming column) 11, a downstream transport line 13 to provide a residence time for the gel spherules to hydrolyze and solidify, and a product collector 15 for collecting and aging the gelled spherules and also for separating the organic medium from the gelled spherules.

The organic medium reservoir 7 may comprise a stainless steel open-top rectangular container. One or more heating blades 17 may be positioned at the rear of the reservoir to heat the organic medium. A thermocouple 19 may be positioned in the basket at the bottom and near the front of the reservoir and is connected to a temperature controller 21 that is used to control the organic medium temperature. A stirrer 23 with its shaft positioned away from the heating blade or blades 17 (other blades not shown) and its impeller located near the bottom of the reservoir is used to mix and maintain the organic medium at a desired temperature. Occupying most of the front space in the reservoir 7 is a large removable basket 15 that serves as a backup to prevent any spilled gelled spherules from being pumped out of the reservoir to the circulating pump.

The pump 9 is used to pump the hot organic medium from the reservoir 7 through a line to the vertically positioned glass gelation column 11. The flow from the pump 9 is divided into two streams that are controlled by manual valves. The flow of one of the streams may be routed to a position above the center of the top of the gelation column 11. Vertically attached to this line may be a tube whose outlet end is inserted into the entrance of the gelation column. The tube is part of the two-fluid nozzle 5 system that is used to control the size of the droplets. The other hot organic medium stream from the pump 9 is routed to a fitting at the bottom of the gelation column 11 and flows up through a shell 25 that surrounds the gelation column 11. The hot organic medium over-flows at the top of the column, first, into the gelation column 11 and, then, into an overflow cup 27. A large tube 29 is connected to a fitting from the overflow cup 27 to route any overflow back to the hot organic medium reservoir 7. During operation, the flow of organic medium from the heating shell 25 is normally adjusted to provide only a slight overflow.

As shown in FIG. 1a, the two-fluid nozzle system 5 is very simple. It comprises a needle 3 that is perpendicularly inserted through the wall of the tube to the midpoint of the hot organic medium carrier stream and is positioned approximately 5 inches above the entrance to the gelation column 11. The chilled broth is jetted into the laminar flowing oil by air pressurizing the broth pot 1, forcing the broth out a tube at the bottom of the broth pot through a short plastic line that is connected to the needle 3. The size of the droplets formed is dependent upon the gauge of the needle used and the flow rates of the hot organic medium and of the broth.

The hot organic medium carrying the droplets from the two-fluid nozzle tube 5 flows directly into the central concurrent flow tube of the jacketed gelation column 11 where it is desirable for the droplets to begin to gel. On exiting the gelation column 11, the gelling spheres flow into a serpentine transport line 13. This line is long enough (about 8-ft.) to allow the gelling spherules to have a total residence time of 25 to 35 seconds to the collection basket 15. The transport time also includes the time the spherules are passing through the gelation column. The gelation column and serpentine transport system are designed to be a siphoning system with a gravity head of about 60-cm for oil temperatures in the range of about 45° to 100° C.

The collection basket 15 is positioned above the hot organic medium reservoir 7, and is used to collect and separate the gel spherules from the hot organic medium as they exit the serpentine transport line 13. The collected gel spherules are aged by lowering the collection basket 15 into the reservoir 7 for between 15 and 30 minutes, preferably 20 minutes. After aging, the bulk of the organic medium is drained from the gel spherules and the residual organic medium is removed by a series of washing steps to remove the reaction impurities.

Another basket of similar design may also be positioned above the hot oil reservoir to filter the return organic medium from a tube, which is connected to the overflow drain line at the top of the gelation column.

In addition to the formation of hydrous iron oxide gels in different shapes and forms, the methods of the present invention include post-treatment of the gels in a multitude of different ways to further enhance the use of the of hydrous iron oxide gels as inorganic ion exchangers, catalysts, ceramics, dielectrics, and getters.

In one embodiment, certain gel-precursor broth formulations of the present invention may be used to provide more control in making ultra fine hydrous iron oxide spherules (1 to 5 μm) with an electric dispersion reactor (EDR) that is described in a U.S. Pat. No. 5,207,973 by M. T. Harris, T. C. Scott, and C. H. Byers entitled "Method and Apparatus for the Production of Metal Oxide Powder" (issued May 1993).

In another embodiment, non-dried hydrous iron oxide gel spherules can be treated to make macroporous spherules of iron hydroxide and iron oxide by making use of a method described by S. J. Teichner for making aerogels ("AEROGELS—Why They Are Vogue," *ChemTech*, pp. 372–377, June 1991), the disclosure of which is hereby incorporated by reference. After being prepared and washed thoroughly to remove the reaction products, the gel spherules are soaked in absolute ethanol several times to replace the water in the spherules with ethanol. The spherules are drained and then placed in a pressure vessel that also contains a small volume of absolute ethanol. The spherules are then heated and pressurized at slightly above the critical temperature (240.7° C.) and the critical pressure (60.52 atm). The pressure is provided by the vapor pressure of the ethanol in the vessel and by applying additional pressure as needed with a non-reactive gas (such as dry air, nitrogen, or argon). Once these conditions are met, the ethanol in the pressure vessel can be slowly vented from the pressure vessel while the critical pressure is maintained with the non-reactive gas. Once the ethanol is purged from the system, the vessel is cooled and the spherules removed. This process prevents the shrinkage of the gel spherules that is caused under normal drying conditions by the movement of the liquid phase in the gel capillaries by evaporation. The surface tension of the liquid creates a concave meniscus in each capillary. As the liquid evaporates, the meniscus recedes, and the compressive forces on the walls of the pores of the internal gel framework collapse, resulting in shrinkage. The liquid-vapor interface occurs only below the critical temperature and pressure of the liquid. Above the critical point the liquid no longer exists. The dried macroporous spherules are in the iron hydroxide form and can be dried at higher temperature to form macroporous spherules of iron oxide. The same process can also be used to make composite macroporous spherules that contain fine catalytic particles (such as Ni, Pd, Pt, or Ag) that are homogeneously dispersed in the matrix. The fine catalytic particles may be selected from organic catalysts or inorganic catalysts. There is no limit as to the type of catalyst particle chosen. These spherules containing catalytic particles can be used in inorganic syntheses and for converting toxic organics to non-toxic organics in waste treatment.

In another embodiment, organic functional groups may be attached to the hydroxides on the surface of and within the matrix of the macroporous iron hydroxide spherules. These functional groups can have cation or anion ion exchange properties that make the engineered, macroporous spherules unique as an inorganic matrix material with organic functional groups. This type of conversion has already been performed by Macherey-Nagel (a German company) using silica-based materials. Macherey-Nagel sells a silica-based strong basic sorbent called NUCLEOSIL® (imported by Brinkman Instruments) which is very effective in removing technetium and iodine from low ionic strength solutions. These materials are about 5 microns in diameter and can be used in batch treatments. The present invention makes a related material that is iron-based in a macroporous engineered form that would be very useful in large-scale column operations. Since this type of sorbent is primarily inorganic, it would be radiolytic stable if loaded with radioactive nuclides. By "radiolytic stable", it is meant that it will not decompose or degas like some organic sorbents.

In still another embodiment, macroporous iron oxide which contains fine gettering particles such as silica, zirconia, alumina could be used as a gettering material in removing volatile species of radioactive cesium (such as Cs, CsOH, CsO, or $Cs_2O$) from off-gas streams. Cesium zirconate forms and is stable in the temperature range of 800° to 1300° C. The treatment of off-gas streams of high temperature, waste treatment processes such as vitrification, molten metal, and incineration, is important in the treatment and stabilization of radioactive waste streams. Getters are trapping materials. For example, as discussed above, quartz wool ($SiO_2$) is used to remove volatile radioactive cesium from the off-gas stream of gas-cooled nuclear reactors in Great Britain. The cesium silicates that are formed are not stable at temperatures >1000° C. Other oxides such as those of titanium, aluminum, thorium, and uranium could also be used as getters.

In another embodiment, hydrous iron oxide spherules are used as precursor materials for hydrothermal conversion preparations of ferrite spherules of barium, strontium, and lead, and combinations of these elements. Barium ferrite spherules (embedded with oxides of Ce, Mg, Pb, or Zn, or mixtures thereof) can be used as a catalyst for the oxidative dehydrogenation of hydrocarbons of four to seven carbon atoms such as the conversion of n-butane to a mixture of butene-1 and butene-2 or conversion to a mixture of butene-1, butene-2 and/or butadiene-1,3 (Reference, U.S. Pat. No. 3,931,351 by R. E. Hinkson and W. H. Taylor entitled "Modification of Iron and Barium Ferrite catalysts" issued January 1976).

In yet another embodiment, hydrous iron oxide spherules are used as precursor materials for hydrothermal conversion preparations of ferrite spherules of barium, strontium, and lead, and combinations thereof for use as dielectric materials. These ferrites are important because they have fairly large dielectric constants (permittivities). The ability to make ferrites as spherules of various sizes could have a number of potential uses in the electronic industry, particularly in the area of computer and electronic circuitry. Modifications of known methods for converting particles of iron oxide and hydrous iron oxide to barium, strontium, or lead ferrite can also be used to convert spherules of hydrous iron oxide to these ferrites. U.S. Pat. No. 4,512,906 by M. Hayakawa entitled "Wet Process for Preparing Ferrites of Magnetoplumbite Structure in Fine Particle Form" is one such method. In the teaching of this patent, fine particles of iron oxides are reacted in a pressure vessel in aqueous alkali solutions of Ba, Sr, and Pb at temperatures at 80 to 360° C. for about 5 h. The mol ratio of Fe to one of these divalent elements is between 4 and 6. The preferred ratio is 5 to 6. The selected salts were nitrates, chlorides, and hydroxides. The preferred temperature range for conversion was given as 180° C. to 260° C. for 5 h. The use of a nitrate salt in combination with the hydroxide (Ba, Sr, or Pb) is preferred because nitrate acts as an oxidizer. Ba-ferrite and Pb-ferrite are also known to have useful solid solutions with one another. The water-washed and dried hydrothermally converted particles were composed of hexagonal plate-shaped crystals $BaO.5.7Fe_2O_3$ that has a magnetoplumbite structure.

To prepare Ba-ferrite, Sr-ferrite, Pb-ferrite, or mixtures thereof, spherules, hydrous iron oxide gel spheres are placed in a modified stainless steel mesh basket (allows mixing without degrading the gel spheres) that is then placed in a stainless steel pressure vessel containing a solution of barium or strontium hydroxide, or a solution of lead acetate and sodium hydroxide or a solution of barium or strontium nitrate and sodium hydroxide. The concentrations of barium, strontium, lead, or mixtures thereof should be such that the mole ratios of the iron to barium or strontium are in the range of 4 to 6. The spherules are then heated with mixing in the sealed vessel in the temperature range of 80° to 350° C. for a period of about 0.5 to about 5.0 hour at temperature to allow for conversion. A temperature of 150° to 250° C. is preferred. To maintain the structural integrity of the gel-spheres, previous hydrothermal conversion experience has shown that it is better to heat longer at the lowest reasonable temperature and not make the conversion solutions too caustic. After cooling the vessel to ambient temperature, the spherules are washed well with deionized water and dried.

If very small spherules are needed, broths of this invention can be used in several sphere-forming systems that are known in the art for generating the smaller sized spherules. For example, broth formulations from the present invention can be used to make small particles, about 0.1 to about 0.5 $\mu$m, using an electric dispersion reactor (EDR).

The two-fluid nozzle system (shown in FIG. 1), which allows fairly good control of the size of the broth droplets, is used primary to make spherules whose dried diameters are >0.1 mm. This system also can be used to make spherules with dried diameters <0.1 mm, but this system offers little control of the gel-sphere size. Broth recipes with lower concentration of iron can be used to provide additional shrinkage of the spherules upon drying. The smaller spherules can be sieved to obtain material of a more uniform size.

One method of drying the washed ferrite spherules, which would minimize the potential of the spherules cracking, is to use a drying unit with a steam generator attachment. The converted wet gel spheres are placed in a stainless steel mesh basket inside a heating unit that allowed moist air or oxygen to uniformly flow through the bed of spherules while heating. Air or oxygen to the unit is first passed through a steam generator that is always heated at a temperature a few degrees lower than the temperature of the heating unit. This prevented condensation of the steam in the heating unit. The spheres are then slowly heated to 90° C. over a period of about 6 hours to remove most of the free water within the spheres. Vaporizing the water from the spheres too quickly can cause the spheres to crack and break apart. If the spherules are not adequately washed during the formation and conversion steps, there is a possibility the spherules might contain traces of organics. The organics would decompose at temperatures between 100° and 200° C. If heated too rapidly in this temperature range, the gases formed can cause some cracking of the spherules. To minimize this from occurring, the spherules are heated slowly to 200° C. in the flowing moist air, 200 to 400 cm$^3$/min. The temperature of the steam generator is maintained at $\leq$95° C. during that period. Afterward, the spherules can be heated to higher temperatures to calcine and sinter.

Another method for converting the hydrous iron oxide spherules to ferrites of barium or strontium or combinations thereof is to use a modified version of a conversion method described by O. J. Heinonen et al. in a publication entitled "Sorption of Strontium (II) and Radio Strontium Ions on Sodium Titanate," *Radiochimica Acta*, 28 (1981), pp.93–96, hereby incorporated herein by reference. After being washed with ammonium hydroxide and water to remove the reaction impurities, the hydrous iron oxide spherules are soaked in absolute ethanol to displace the free water in the spherules with absolute ethanol. The ethanol is then drained from the spherules and the spherules placed in a heating vessel which contains a solution of barium or strontium ethoxide in which the (Ba or Sr)/Fe mole ratio $\geq$2. The solution is then heated to 70° C. to 80° C. for a period of 3 to 10 hours, while mixing vigorously with N$_2$ gas to convert the spherules to the iron (III) ethoxide form. The heating vessel has a condenser to prevent loss of reaction solutions. Afterwards, about half the reaction solution is removed from the vessel and replaced with deionized water. To hydrolyze the spherules to barium or strontium ferrite, the spherules are heated for about 5 to 10 hours while mixing vigorously with nitrogen gas. The reaction solution is then drained from the spherules and the spherules are washed well with deionized water. The crystal morphology of the barium or strontium ferrite and the stability of the spherules are both dependents upon the drying method used. A slow heating ramp and heating the spherules in a steam atmosphere is important.

In another embodiment, the hydrous iron oxide spherules may be converted to spherules of iron monohydrogen phosphate (FeH(HPO$_4$)$_2$.nH$_2$O). Hydrous iron oxide spherules are converted to iron monohydrogen phosphate spherules simply by contacting them with $\leq$0.2 M phosphoric acid for a period of 2 to 3 days.

In yet another embodiment, hydrous iron oxide spherules having suspendable particles homogeneously embedded within may be prepared to form a composite sorbent. In this process, first a hydrous iron oxide broth is formed. Then, a predetermined amount of the suspendable particles are added to the broth, the amount added being of a desired weight percent of the total weight of the composite sorbent. Additionally, the desired weight percent added is an amount sufficient to optimize the effectiveness of the composite sorbent. Then, while continuously mixing the suspendable particles and the aqueous broth to maintain a homogeneous blend, the homogeneous blend is contacted with an immiscible spherule-forming medium at a temperature from about 45° C. to about 100° C. The temperature of the medium is maintained to form sol-gel spherules using an internal gelation process with gelation times sufficient to allow the suspendable particles to remain suspended prior to and up to complete gelation.

In another embodiment, hydrous iron oxide spherules may be formed into hydrous iron oxide spherules having suspendable particles of at least one different sorbent homogeneously embedded therein to form the composite sorbent previously discussed. Afterward, the composite spherules are converted to iron monohydrogen phosphate spherules having suspendable particles of the different sorbent homogeneously embedded therein. This embodiment is basically a combination of the previous two embodiments. The composite hydrous iron oxide spherules are converted to composite iron monohydrogen phosphate spherules simply by contacting them with $\leq$0.2 M phosphoric acid for a period of 2 to 3 days.

In another embodiment of the present invention, iron oxide spherules may be formed. The hydrous iron oxide spherules are formed as previously indicated. Then, the spherules are placed in a heating unit to form a bed of spherules within the heating unit, the heating unit providing means to allow moist heated air or oxygen to uniformly flow through the bed of spherules while heating. The moist heated air or oxygen is preferably at a temperature less than the spherules within the heating unit that helps to prevent condensation within the heating unit. The spherules are heated within the heating unit to a temperature and for a period of time sufficient to vaporize the free water within the spheres. The spherules are heated further to a temperature and for a period of time sufficient to form an oxide of iron.

In still another embodiment, iron oxide spherules may be formed having particles of different sorbents homogeneously dispersed therein. This embodiment follows the process outlined in the preceding paragraph relating to the formation of iron oxide particles. However, prior to forming the initial hydrous iron gel spherules, a predetermined amount of the suspendable particles is added to the broth, the amount added being of a desired weight percent of the total weight of the composite sorbent. Additionally, the amount added is an amount sufficient to optimize the effectiveness of the composite sorbent. Then, after the composite gels are formed, the gels are heated as previously discussed to generate the iron oxide particles having particles of different sorbents homogeneously dispersed therein.

In some embodiments, the hydrous iron oxide broth may be formed into fibers. These fibers may be either of hydrous iron oxide or iron oxide. Additionally, these rods or fibers may include suspendable particles homogeneously embedded within the hydrous iron oxide or iron oxide rods or fibers. These rods or fibers are prepared by first forming the broth, either with or without additional particles therein. Then, the broth is formed into a gel, which is then formed into a rod or fiber. This process may be performed using a number of different rod and fiber forming techniques. For example, the broth may be pulled through an electrophoresis capillary tube. Then, the tube may be heated to a temperature between ambient and 100° C. to form the gel. Alternatively, the broth may be formed into gel spherules that are placed in an extruder and extruded into microfibers. The gels could be easily washed to remove any reaction impurities. These fibers may also be heated to drive off water to form iron oxide fibers.

In other embodiments, other shapes of the hydrous iron oxide may be formed, such as films or slabs. These films or slabs may be either of hydrous iron oxide or iron oxide. Additionally, these films may also include suspendable particles homogeneously embedded within the hydrous iron oxide or iron oxide films or slabs. These films or slabs are prepared by first forming the broth, either with or without additional particles therein. Then, the broth is formed into a gel, which is then formed into the shape of a film or slab. This may be performed using a number of different film- or slab-forming techniques. For example, a substantially flat surface may be inserted into the broth and withdrawn with a thin layer of broth thereon. Then, the surface may be heated to a temperature between ambient and 100° C. to form the gel film. Alternatively, the broth may be formed into gel spherules that are placed in an extruder and extruded into thin films. Finally, the broth may be placed into a mold and heated, thereby forming films or slabs, depending upon the mold. The surfaces of the molding cavities may be pre-treated for easier removal of the gels. Once removed from the molds, the gels could be easily washed to remove any reaction impurities. These films or slabs may also be heated to drive off water to form iron oxide films or slabs.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

As pointed out previously, the degree of partial hydrolysis of the iron used in a broth is one of the important process parameters for the present invention. The amount of partial hydrolysis of the iron in a broth is a controlling parameter for the gelation process for making hydrous iron oxide spherules, or gels in other configurations. Partial hydrolysis of iron nitrate (or other anion) with base, preferably ammonium hydroxide ($NH_4OH$), provides for a greater range of usable broth formulation that allows for minimal use of the organic base and for lower temperatures for gel formation. Other bases can be used for the partial hydrolysis of iron, for example any alkali hydroxide such as sodium hydroxide or potassium hydroxide. The preferred base used in the below examples was $NH_4OH$. For the examples that are described below, four clear, iron salt feedstock solutions were prepared with $OH^-/Fe^{+3}$ mole ratios of 0.0, 0.5, 1.0, and 1.5. A second stock solution was used in the example in which HMTA was used as the organic base and urea was selected for the complexing agent, and the concentration of each was 3.2 M. The mole concentration of urea in each broth was equal to the mole concentration of HMTA. The broths were heated in the range of 45° to 95° C. These examples define the optimum formulation and conditions for making hydrous iron oxide spherules by the internal gelation method. These examples allow one to pick ideal broth formulations and gelation temperatures for the preparation of hydrous iron oxide spherules that satisfy economic and material needs. In general, the best broth formulations are ones that are stable for at least one hour and ones whose droplet gel-initiation times are within at least 15 seconds at the lowest possible temperature providing gels of good gel rigidity (5 to 9 on the "collins" scale).

EXAMPLE 1

Figure 2:
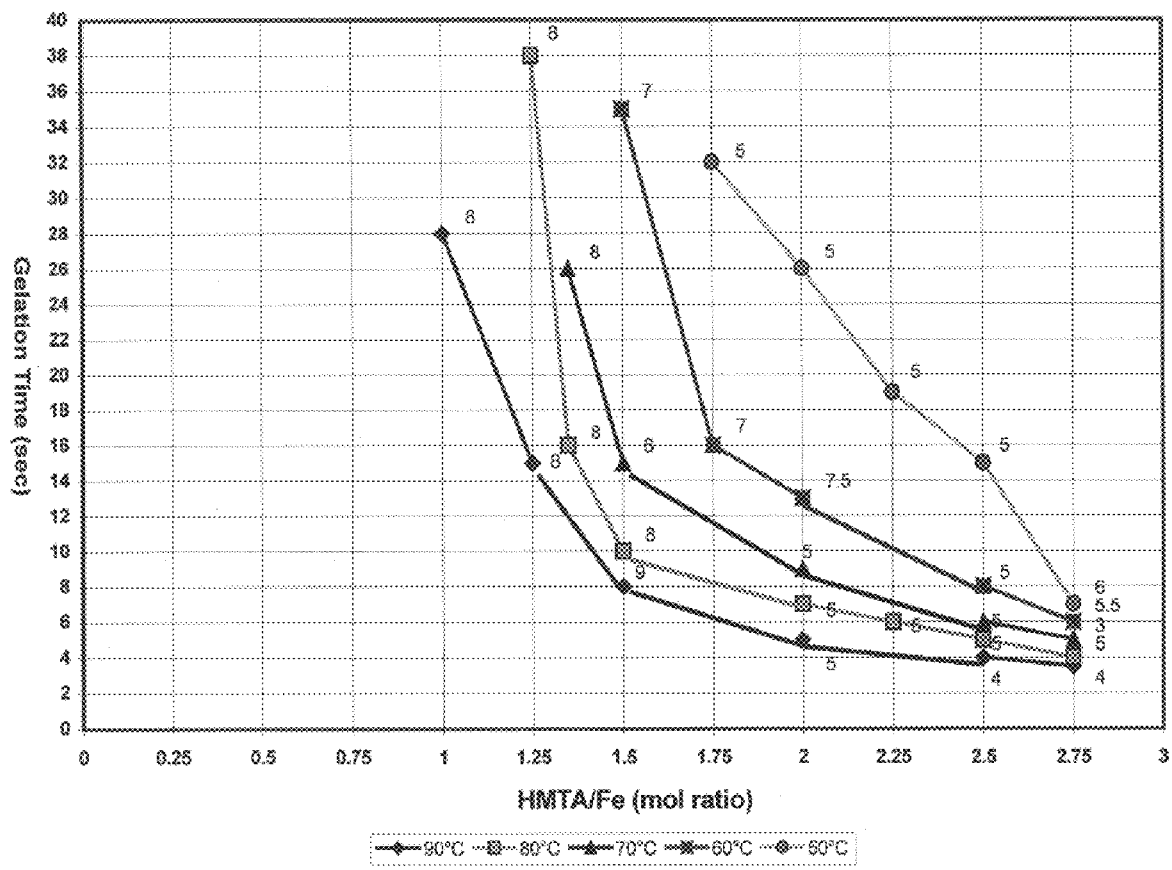
FIG. 2 reflects the data obtained in EXAMPLE 1, showing the gelation initiation time as a function of HMTA/Fe mol ratio and temperature.

Broths were prepared in which the iron was not partially hydrolyzed with ammonium hydroxide ($NH_4OH$) ($OH^-/Fe^{+3}$ mole ratio=0.0). The broth concentration of HMTA and that of urea ranged from 1.0 to 2.0 M. The iron concentration of the broths ranged from 0.9 to 1.7 M. In this range of concentrations, the heated broths gelled in the range of 3 to 38 seconds. FIG. 2 gives the gelation initiation time as a function of HMTA/Fe mole ratio and temperature. The best results were obtained at temperatures of 60° C. and higher which covers the temperature range of 55° to 95° C. Broths with HMTA/Fe mole ratios that were 1 or less gelled too slowly or would not gel at all. Broths prepared with HMTA/Fe mole ratio of 3 were not stable and could not be tested. FIG. 2 also gives the degree of gel rigidity as defined by the collins scale. These data show that an HMTA/Fe mole ratio of 1 or more is needed for a broth to have gel times of 30 seconds or less. Higher forming temperatures also allow broths with less HMTA and urea to be used to obtained the more ideal gelation time of 15 seconds or less, and these broths have HMTA/Fe mole ratios between 1 and 2. Spherules that measured 3 and 4 on the collins scale were too soft and tend to clump when formed and can stick to apparatus surfaces. The best spherules have rigidities of 6 to 8 on the Collins scale. Depending on the HMTA concentration, the pH of these gels ranged from about 2.9 to 6.0. Generally, the shorter the gelation time, the higher the pH of the gel.

EXAMPLE 2

Figure 3:
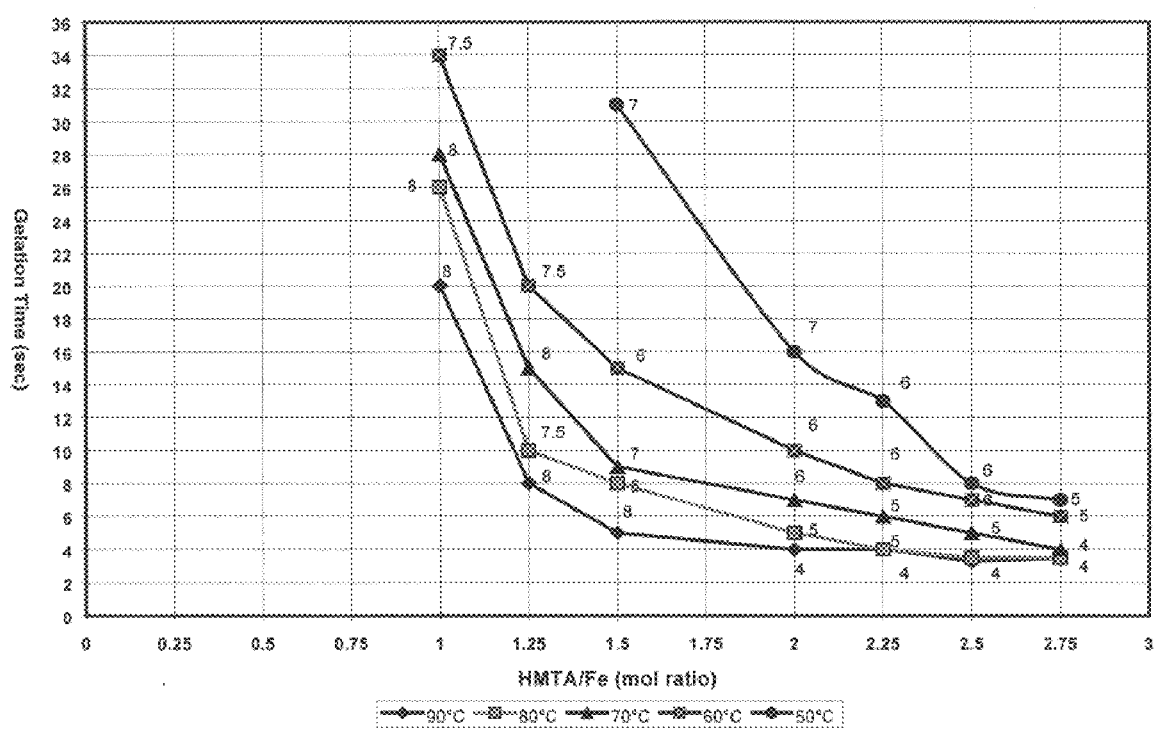
FIG. 3 reflects the data obtained in EXAMPLE 2, showing the gelation initiation time as a function of HMTA/Fe mol ratio and temperature.

Broths were prepared in which the iron in the feed stock solution was partially hydrolyzed with NH$_4$OH to provide an OH$^-$/Fe$^{+3}$ mole ratio of 0.5. The HMTA concentration of the broths ranged from 0.8 to 2.2 M. The iron concentration of the broths ranged from 0.9 to 2.1 M. In this range of concentrations, the heated broths gelled between 4 and 34 seconds. FIG. 3 gives the gelation initiation time as a function of HMTA/Fe mole ratio and temperature. Good gel formation was obtained with certain broths at each of the temperatures. Broths with HMTA/Fe mole ratios of 1 or less gelled too slowly or would not gel at all. Broths prepared with HMTA/Fe mole ratio of 3 were not stable and could not be tested. FIG. 3 also gives the degree of rigidity as defined by the collins scale. These data show that an HMTA/Fe mole ratio of 1 or greater is needed for a broth to have gel times of 30 seconds or less. Higher forming temperatures also allow broths with less HMTA and urea to be used to obtained the more ideal gelation time of 15 seconds or less, and these broths had HMTA/Fe mole ratios between 1 and 2. Spherules that were measured as 3 and 4 on the collins scale were too soft. As a rule, the best spherules have rigidities of 6 to 8 on the Collins scale. The pH of the gels ranged from about 2.9 to 5.7 depending upon the HMTA concentration. Generally, the shorter the time needed to start gelation the higher the pH of the gel.

EXAMPLE 3

Figure 4:
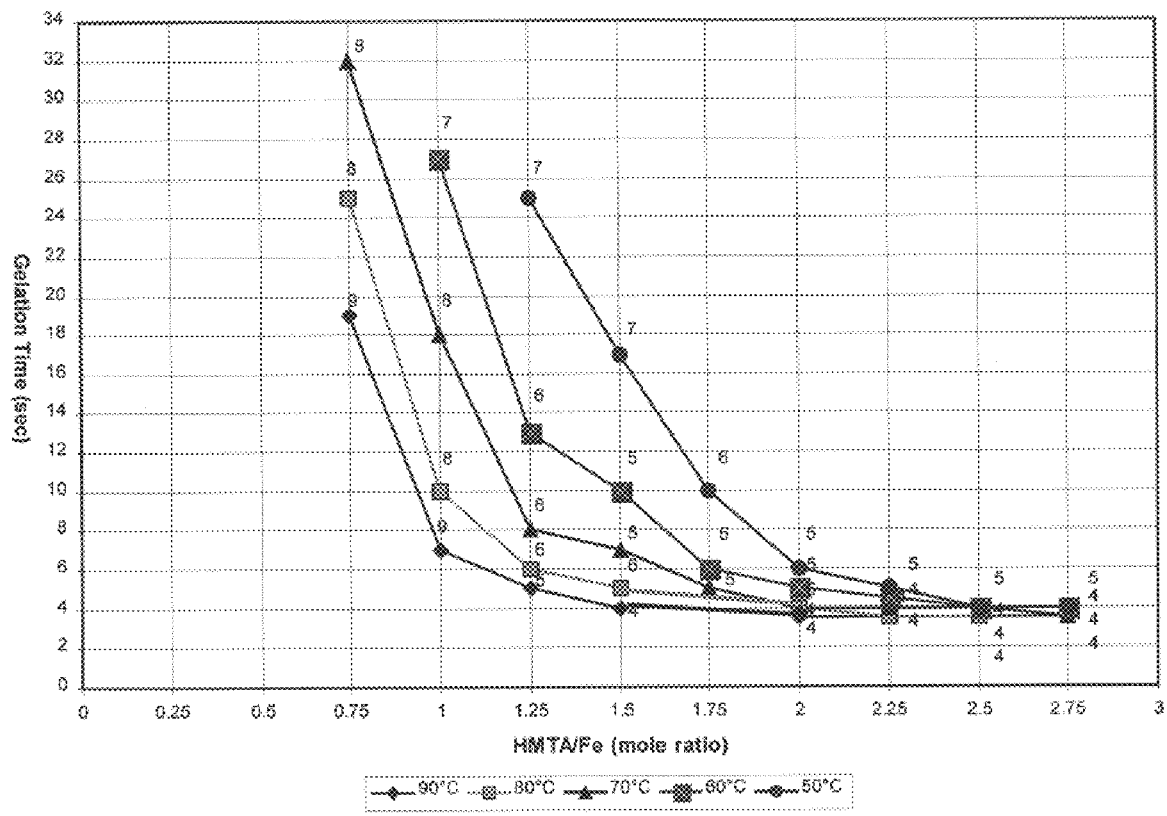
FIG. 4 reflects the data obtained in EXAMPLE 3, showing the gelation initiation time as a function of HMTA/Fe mol ratio and temperature.

Broths were prepared in which the iron in the feed stock solution was partially hydrolyzed with NH$_4$OH to provide an OH$^-$/Fe$^{+3}$ mole ratio of 1.0. The HMTA concentration of the broths ranged from 0.8 to 2.2 M. The iron concentration of the broths ranged from 0.9 to 2.1 M. In this range of concentrations, the heated broths gelled between 4 and 32 seconds. FIG. 4 gives the gelation initiation time as a function of HMTA/Fe mole ratio and temperature. Good gel formation was obtained with certain broths at each of the temperatures. Broths with HMTA/Fe mole ratios of 1 or less gelled too slowly or would not gel at all. Broths prepared with HMTA/Fe mole ratio of 3 were not stable and could not be tested. FIG. 4 also gives the degree of rigidity as defined by the collins scale. These data show that an HMTA/Fe mole ratio of 0.75 or greater is needed for a broth to have gel times of 30 seconds or less. Higher forming temperatures also allow broths with less HMTA and urea to be used to obtained the more ideal gelation time of 15 seconds or less, and these broths had HMTA/Fe mole ratios between 0.75 and 1.75. Spherules that were measured as 3 and 4 on the collins scale were too soft. As a rule, the best spherules have rigidities of 6 to 9 on the Collins scale. The pH of the gels ranged from about 2.5 to 5.9 depending upon the HMTA concentration. Generally, the shorter the time needed to start gelation the higher the pH of the gel.

EXAMPLE 4

Figure 5:
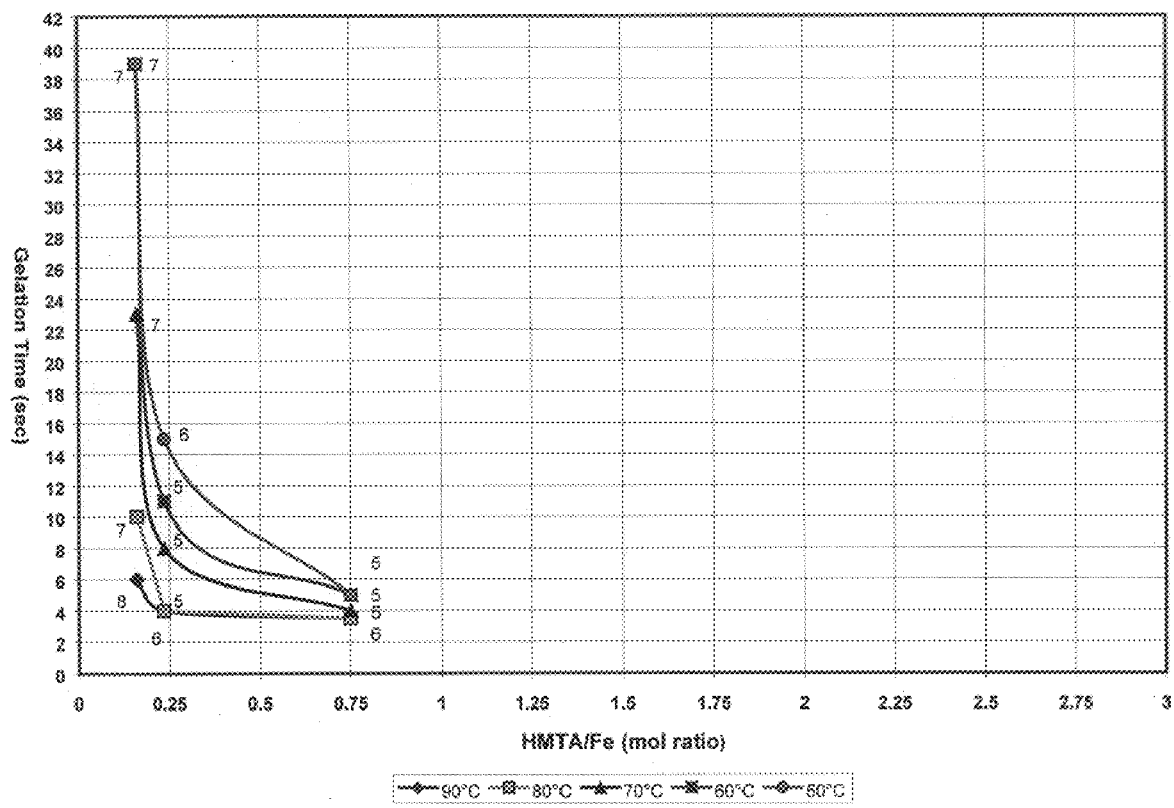
FIG. 5 reflects the data obtained in EXAMPLE 4, showing the gelation initiation time as a function of HMTA/Fe mol ratio and temperature.

Broths were prepared in which the iron in the feed stock solution was partially hydrolyzed with NH$_4$OH to provide an OH$^-$/Fe$^{+3}$ mole ratio of 1.5. The HMTA concentration of the broths ranged from 0.4 to 1.3 M. The iron concentration of the broths ranged from 1.3 to 2.2 M. In this range of concentrations, the heated broths gelled between 5 and 39 seconds. FIG. 5 gives the gelation initiation time as a function of HMTA/Fe mole ratio and temperature. Good gel formation was obtained with certain broths at each of the temperatures. Broths prepared with HMTA/Fe mole ratio of land greater were not stable and could not be tested. FIG. 5 also gives the degree of rigidity as defined by the collins scale. These data show that an HMTA/Fe mole ratio of 0.15 or greater is needed for a broth to have gel times of 30 seconds or less. Higher forming temperatures also allow broths with less HMTA and urea to be used to obtained the more ideal gelation time of 15 seconds or less, and these broths had HMTA/Fe mole ratios between 0.15 and 0.75. Spherules that were measured as 3 and 4 on the collins scale were too soft. As a rule, the best spherules have rigidities of 6 to 9 on the Collins scale. The pH of the gels ranged from about 2.2 to 4.9 depending upon the HMTA concentration. Generally, the shorter the time needed to start gelation the higher the pH of the gel.

All patents, publications and abstracts cited above are incorporated herein by reference in their entirety.

While there has been shown and described what are at present considered the preferred embodiments of the invention, it will be obvious to those skilled in the art that various changes and modifications can be made therein without departing from the scope of the invention defined by the appended claims.

What is claimed is:

1. A method for preparing hydrous iron oxide gels comprising the steps of:

a) forming a stable homogeneous aqueous broth comprising hexamethylenetetramine (HMTA), urea and an iron metal salt, said broth having a HMTA concentration in a range from about 0.4 to about 32.4 M, a urea concentration in a range from about 0.4 M to about 4.0 M, and an iron metal salt concentration in a range from about 0.4 M to about 22 M;

b) placing said aqueous broth within a gel-forming operation, wherein said gel-forming operation is at a temperature from about ambient to about 100° C.; and c) maintaining said temperature of said gel-forming operation from about ambient to about 100° C. to form a hydrous iron oxide gel using an internal gelation process.

2. The method of claim 1, wherein said HMTA is in crystalline form.

3. The method of claim 1, wherein said iron metal salt is selected from iron nitrate, iron chloride, or iron acetate.

4. The method of claim 1, wherein said broth has a HMTA concentration in a range from about 1.2 M to about 3.2 M, a urea concentration in a range from about 1.2 M to about 2.0 M and an iron metal salt concentration in a range from about 1.0 M to about 1.6 M.

5. The method of claim 1, wherein said stable homogeneous aqueous broth of step a) further comprises a base to partially hydrolyze said iron wherein said broth has an OH$^-$/Fe$^{+3}$ mole ratio in the range of 0.0 to 1.5.

6. The method of claim 5, wherein said base used to partially hydrolyze said iron is ammonium hydroxide or an alkali hydroxide.

7. The method of claim 6, wherein said iron metal salt is iron nitrate, and said base used to partially hydrolyze said iron is ammonium hydroxide.

8. The method of claim 6, wherein said iron metal salt is iron chloride, and said base used to partially hydrolyze said iron is an alkali hydroxide.

9. The method of claim 5, wherein said broth has a HMTA concentration in a range from about 1.2 M to about 3.2 M, a urea concentration in a range from about 1.2 M to about 2.0 M, an iron metal salt concentration in a range from about 1.0 M to about 1.6 M, and an OH$^-$/Fe$^{+3}$ mole ratio in the range from 0.0 to 1.5.

10. The method of claim 9, wherein said iron metal salt is iron nitrate, and said base used to partially hydrolyze said iron is ammonium hydroxide.

11. The method of claim 9, wherein said iron metal salt is iron chloride, and said base used to partially hydrolyze said iron is an alkali hydroxide.

12. The method of claim 1, wherein said broth is stable for 1 hour or more.

13. The method of claim 1, wherein said gel-forming operation comprises a means for forming hydrous iron oxide films or gel slabs.

14. The method of claim 13, wherein said means for forming films or gel slabs comprises a substantially flat surface which is inserted into said broth and withdrawn with a thin layer of broth thereon, whereby as said broth is heated, a hydrous iron oxide gel film is formed thereon said substantially flat surface.

15. The method of claim 13, wherein said means for forming films or gel slabs comprises forming gel spherules that are placed in an extruder and extruded into said hydrous iron oxide film or slab.

16. The method of claim 13, wherein said means for forming films or gel slabs comprises placing said broth into a molding cavity and heating said broth to form said hydrous iron oxide film or slab.

17. The method of claim 13 further comprising the step of heating said hydrous iron oxide film or slab to drive off water to form an iron oxide film or slab.

18. The method of claim 1, wherein said gel-forming operation comprises a means for fanning hydrous iron oxide fibers.

19. The method of claim 18, wherein said means for forming hydrous iron oxide fibers comprises forming said broth into gel spherules which are washed and then placed in an extruder and extruded into hydrous iron oxide microfibers.

20. The method of claim 18, wherein said means for forming hydrous iron oxide fibers comprises an electrophoresis device.

21. The method of claim 18, further comprising the step of heating said hydrous iron oxide fibers to drive off water to form iron oxide fibers.

22. The method of claim 1, further comprising the step of heating said hydrous iron oxide gel to drive off water to form an iron oxide gel.

23. The method of claim 1, further comprising the step of adding an amount of a particulate sorbent to said broth and mixing to produce a substantially homogeneous mixture, wherein said substantially homogeneous mixture is then placed into said gel-forming operation to form a composite hydrous iron oxide gel having a particulate embedded therein.

24. The method of claim 23 further comprising the step of heating said hydrous iron oxide gel having said particulate embedded therein to drive off water to form an iron oxide gel having a particulate embedded therein.

25. The method of claim 23 further comprising the step of forming said hydrous iron oxide gel having said particulate embedded therein into a shape selected from a film, a slab or a fiber.

26. The method of claim 25, further comprising the step of hearing said hydrous iron oxide gel having said particulate embedded therein to drive off water to form an from oxide gel having said particulate embedded therein, wherein said iron oxide gel having said particulate embedded therein is in the shape of a film, a slab or a fiber.

27. The method of claim 1, further comprising the steps of:
  d) soaking said hydrous iron oxide gel in absolute ethanol to replace water in said gel with absolute ethanol;
  e) placing said gel in a pressure vessel which also contains a small volume of absolute ethanol, wherein said gel is then heated and pressurized at a temperature greater than about 240° C. and about about 60 atm to vaporize said ethanol; and
  f) venting said vaporized ethanol from said pressure vessel while the critical pressure is maintained with the non-reactive gas to form a macroporous iron hydroxide gel.

28. The method of claim 27 further comprising the step of drying said macroporous iron hydroxide gel at a higher temperature to form macroporous gel of iron oxide.

29. The method of claim 27 further comprising the step of adding catalytic particles to said broth prior to forming said macroporous iron hydroxide gel.

30. The method of claim 29 wherein said catalytic particles are selected from inorganic catalysts, organic catalysts, or mixtures and combinations thereof.

31. The method of claim 29 further comprising the step of attaching organic functional groups to the hydroxides on a surface of and within a matrix of said macroporous iron hydroxide gels.

32. The method of claim 1 further comprising the step of attaching organic functional groups to hydroxides on a surface of and within a matrix of said hydrous iron oxide gels.

33. The method of claim 1 wherein said gel-forming operation in step c) forms hydrous iron oxide spherules, said method further comprising the steps of:
  (d) placing said hydrous iron oxide spherules into a solution of barium hydroxide or strontium hydroxide, or a solution of lead acetate and sodium hydroxide, or a solution of barium nitrate and sodium hydroxide or a solution of strontium nitrate and sodium hydroxide such that the mole ratio of iron to barium or strontium in said gels is in the range from at least 4:1 to 6:1; and
  (e) placing said spherules in a sealed reaction vessel and heating to a temperature in the range of about 85° C. to about 350° C. for a period of about 0.5 to about 5.0 hours to convert said hydrous iron oxide spherules to spherules of Ba-ferrite, Sr-ferrite, Pb-ferrite, or mixtures thereof.

34. The method of claim 33 wherein said temperature range in step e) is 100° C. to 250° C.

35. The method of claim 1 wherein said gel-forming operation in step c) farms hydrous iron oxide spherules, said method further comprising the steps of:
  d) soaking said hydrous iron oxide spherules in absolute ethanol to replace water in said spherules with absolute ethanol;
  e) draining said ethanol from said spherules;
  f) placing said spherules in a heating vessel that contains a solution of barium or strontium ethoxide in which the Ba/Fe or Sr/Fe mole ratio is $\geq 2$, forming a reaction solution containing said spherules;
  g) heating said reaction solution containing said spherules to 70° C. to 80° C. for a period of 3 to 10 hours while mixing vigorously with $N_2$ gas to convert said spherules to the iron (III) ethoxide form, said heating vessel having a condenser to prevent loss of reaction solutions during said heating step;
  h) removing about half of said reaction solution volume from said vessel and replacing said volume with deionized water;

i) hydrolyzing said spherules to barium ferrite or strontium ferrite by heating said spherules in said aqueous reaction solution for about 5 to 10 hours while mixing vigorously with nitrogen gas;

j) draining said aqueous reaction solution from said spherules;

k) washing said spherules thoroughly with deionized water; and l) drying said spherules.

36. The method of claim 33 or 35 further comprising the step of using an electric dispersion reactor to produce ultra fine barium ferrite spherules.

37. The method of claim 35, wherein said spherules have a size in the range of about 0.1 $\mu$m to about 0.5 $\mu$m.

38. The method of claim 1 further comprising the step of using an electric dispersion reactor to produce ultra fine hydrous iron oxide spherules.

39. The method of claim 38, wherein said spherules have a size in the range of about 0.1 $\mu$m to about 0.5 $\mu$m.

40. The method of claim 1 wherein said gel-forming operation in step c) forms hydrous iron oxide spherules, said method further comprising the steps of:

d) converting said hydrous iron oxide spherules to spherules of iron monohydrogen phosphate by contacting said hydrous iron oxide spherules with 0.2 M phosphoric acid for a period of 2 to 3 days;

e) rinsing said iron monohydregen phosphate spherules with deionized water; and f) drying said iron monohydrogen phosphate spherules.

41. The method of claim 1, wherein said broth has a HMTA concentration from about 0.4 M to about 2.0 M, a urea concentration from about 0.4 M to about 4.0 M, an iron metal salt concentration from about 0.4 M to about 2.2 M, wherein said broth is heated to a temperature from about 45° C. to about 95° C. to form said hydrous iron oxide gel.

42. The method of claim 1, wherein said broth has a HMTA concentration from about 0.4 M to about 2.2 M, a urea concentration from about 0.4 M to about 4.0 M, an iron metal salt concentration from about 0.4 M to about 2.1 M with said iron being partially hydrolyzed with ammonium hydroxide to provide an OH$^-$/Fe$^{+3}$ mole ratio of 0.05, and wherein said broth is heated to a temperature from about 45° C to about 95° C. to form said hydrous iron oxide gel.

43. The method of claim 1, wherein said broth has a HMTA concentration from about 0.4 M to about 2.2 M, a urea concentration from about 0.4 M to about 4.0 M, an iron metal salt concentration from about 0.4 M to about 2.1 M with said iron being partially hydrolyzed with ammonium hydroxide to provide an OH$^-$/Fe$^{+3}$ mole ratio of 1.0, and wherein said broth is heated to a temperature from about 45° C. to about 95° C. to form said hydrous iron oxide gel.

44. The method of claim 1, wherein said broth has a HMTA concentration from about 0.4 M to about 1.3 M, a urea concentration from about 0.4 M to about 2.6 M, an iron metal salt concentration from about 0.4 M to about 2.2 M, with said iron being partially hydrolyzed with ammonium hydroxide to provide an OH$^-$/Fe$^{+3}$ mole ratio of 1.5, and wherein said broth is heated to a temperature from about 45° C. to about 95° C. to form said hydrous iron oxide gel.

45. The method of claim 1, wherein said broth is at a temperature from about 0° C. to about 10° C.

46. The method of claim 1, wherein said broth has a mole ratio of HMTA to iron of about or greater than 0.75:1 and a mole ratio of urea to iron of about or greater than 0.75:1.

47. A method for preparing hydrous iron oxide gel comprising the steps of:

a) forming a homogeneous aqueous broth comprising hexamethylenetetramine (HMTA), urea, an iron metal salt, wherein said broth is at a temperature from about 0° C. to about 10° C., wherein said broth has an HMTA concentration in a range from about 0.4 M to about 2.2 M, a urea concentration in a range from about 0.4 M to about 4.0 M, an iron metal salt concentration in a range from about 0.4 M to about 2.2 M with said iron being partially hydrolyzed with ammonium hydroxide to provide an OH$^-$/Fe$^{+3}$ mole ratio 0.0 to 1.5, further wherein said broth has a mole ratio of HMTA to iron greater than 0.75:1 and a mole ratio of urea to iron greater than 0.75:1;

b) placing said aqueous broth with a gel-forming operation, wherein said gel-forming operation is at a temperature from about 45° C. to about 95° C.; and c) maintaining said temperature of said gel-forming operation from 45° C. to about 95° C. to form a hydrous iron oxide gel using an internal gelation process.

* * * * *